United States Patent [19]

Peng

[11] Patent Number: 5,240,341
[45] Date of Patent: Aug. 31, 1993

[54] MECHANICAL JOINT FOR SYMBOL CODE SCANNERS

[75] Inventor: Ke-Ou Peng, Delft, Netherlands

[73] Assignee: Opticon Sensors Europe B.V., Hoofddorp, Netherlands

[21] Appl. No.: 824,055

[22] Filed: Jan. 23, 1992

[30] Foreign Application Priority Data

Jan. 25, 1991 [NL] Netherlands .................. 9100129

[51] Int. Cl.[5] .............................................. F16C 3/02
[52] U.S. Cl. ............................. 403/59; 403/24; 403/83; 403/97; 403/147; 248/921; 248/278; 248/183
[58] Field of Search .................. 403/146–148, 403/93, 96, 97, 101, 91, 84, 116, 73, 59, 82, 83, 24; 248/921, 278, 183

[56] References Cited

U.S. PATENT DOCUMENTS

| 117,409 | 7/1871 | Green ............................ 403/146 |
| 963,913 | 7/1910 | Lyhne ........................... 403/97 X |
| 1,123,839 | 1/1915 | Bridges ......................... 403/145 |
| 1,152,876 | 9/1915 | Brown et al. ................. 403/147 |
| 1,536,985 | 5/1925 | Swinford ...................... 248/186 |
| 2,241,506 | 5/1941 | Eppler, Jr. .................... 403/146 |
| 4,158,194 | 6/1979 | McWaters et al. ........... 340/146.3 |
| 4,696,450 | 9/1987 | Huang .......................... 248/661 |
| 4,700,017 | 10/1987 | Morand ......................... 403/73 X |
| 4,917,343 | 4/1990 | Wainscott ..................... 403/146 X |
| 4,939,356 | 7/1990 | Rando et al. ................. 235/467 |
| 5,123,621 | 6/1992 | Gates ............................ 248/183 X |
| 5,127,617 | 7/1992 | Bergetz ........................ 248/278 |

FOREIGN PATENT DOCUMENTS

| 087282 | 8/1983 | European Pat. Off. . |
| 341717 | 11/1989 | European Pat. Off. . |
| WO9012356 | 10/1990 | PCT Int'l Appl. . |
| 24940 | of 1909 | United Kingdom .......... 403/370 |

Primary Examiner—Randolph A. Reese
Assistant Examiner—Harry C. Kim
Attorney, Agent, or Firm—Parmelee, Bollinger & Bramblett

[57] ABSTRACT

Joint for mechanically connecting, on the one hand, a scanner for symbol codes and, on the other, a processing device for processing the signals produced by the scanner, for varying through a first angle the relative position of the scanner and the processing device at least partially provided with an at least partially conical axle for providing a first rotational axis, which axle is movable disposed in an at least partially conical recess in a supporting block, and further provided with at least one resilient element for pressing the axle in the recess. For varying the relative position of the scanner and the processing device about a second rotational axis, the joint is provided with a disc-shaped element which is connected to the axle through an arm. At least the disc-shaped element and the arm are preferably made hollow for passing a cable through the inside of the joint.

17 Claims, 1 Drawing Sheet

MECHANICAL JOINT FOR SYMBOL CODE SCANNERS

BACKGROUND OF THE INVENTION

The invention relates to a joint for mechanically connecting, on the one hand, a scanner for symbol codes and, on the other, a processing device for processing the signals produced by the scanner.

In practice, scanners for symbol codes are known which are accommodated with their respective processing device in one housing. For many applications, for example for reading bar codes, the scanner has to be held in the hand and always has to be directed at the codes to be scanned. The combination of the scanner and the processing device in one housing has the disadvantage that the whole unit always has to be moved in order to direct the scanner at the codes. Scanners in which the processing device is accommodated in a separate housing, and in which the signals produced by the scanner are transmitted to the processing device by means of a cable, are also known in practice. This arrangement does, however, have the disadvantage that always a second separate unit, namely the processing device, has to be carried.

The same problem is encountered in the case of readers for symbol codes which are provided with an array of photosensitive elements, in particular if a linear array is used. In the case of such readers the array always has to be directed towards the code in order to read it. The combination of the reader and the corresponding processing device in one housing, or in two separate housings, also entails the above-mentioned disadvantages. The term "reader" can therefore also be substituted for "scanner" in the text below.

U.S. Pat. No. 4,939,356 discloses a bar code scanner having a scanner head at the end of a flexible mount, which allows the scanner head to be pointed in the desired direction. The mount may comprise a goose neck type support or may comprise a series of pivots or hinges. It is, however, difficult to exactly achieve and maintain a specific orientation by means of a goose neck type support, while a series of pivots or hinges, the exact structure of which is not disclosed in said U.S. patent, will not maintain the orientation of the scanner head.

SUMMARY OF THE INVENTION

The object of the invention is to eliminate the disadvantages of the existing devices and to provide a joint for mechanically connecting a scanner and a processing device, with which the relative position of the devices can be varied, and with which the set relative position can also be automatically maintained.

It is a further object of the invention to provide a joint which allows a cable to be passed through the interior of the joint in order to provide mechanical protection for the cable.

These objects can be met by a joint of the type mentioned in the preamble when, according to the present invention, for varying the position of the scanner relative to the processing device the joint is at least provided with an at least partially conical axle for providing a first rotational axis, the axle being movable disposed in an at least partially conical recess in a supporting block, the joint being further provided with at least one resilient element for pressing the axle into the recess. By using a resilient element which presses the conical axle into the conical recess, such friction is achieved between the axle and the bearing that the state of the joint is maintained in any position. If the user now moves the axle in such a way that it comes away from the supporting block, the axle can be rotated relative to the supporting block, so that the joint can be set in another position. When the joint is released, the resilient element presses the axle into the supporting block again, with the result that the axle is locked. In this way it is possible to set the scanner in a simple manner relative to the processing device about a first rotational axis parallel to the lengthwise direction of the supporting block.

For symbol code scanners with a two-dimensional scanning pattern it is sufficient for the joint to have one degree of freedom, i.e. the orientation of the scanner relative to the symbol code can be varied with one rotational axis, since a rotation in the plane of the scanning pattern is not necessary. However, many scanners for symbol codes have a linear scanning pattern, so that for correct scanning of the code it is necessary to rotate the scanning pattern in such a way in the plane of the code that the lengthwise directions of the pattern and of the code run virtually parallel, or coincide. For a scanner with a linear scanning pattern (or a reader with a linear array) a rotation about a second axis, i.e. a second degree of freedom, is thus very desirable. The joint according to the invention is therefore advantageously designed in such a way that a movement in more than one direction is possible. A preferred embodiment of the invention is to this end characterised in that for varying the relative position of the scanner and the processing device about a second rotational axis the joint is provided with a disc-shaped element mounted in a holder in such a way that it can rotate about the second rotational axis. Such a design permits rotation of the holder about the disc-shaped element. If the holder is fixed to, for example, the scanner, while the disc-shaped element is connected to another part of the joint, the position of the scanner can be varied through a second angle, provided that the rotational axis of the disc-shaped element does not coincide with the rotational axis of the conical axle. The disc-shaped element is preferably connected to the partially conical axle by means of an arm in such a way that the second rotational axis is approximately perpendicular to the first rotational axis. Two independent directions of rotation are achieved in this way, which permits rotation in any desired direction.

In order to secure the position of the disc-shaped element relative to the holder, the holder is preferably provided with means for exerting a frictional force on the disc-shaped element. These means preferably comprise a ball and a spring, the ball being pressed by the spring against the disc-shaped element. This causes such a friction force to be exerted on the disc-shaped element that the latter will turn only relative to the holder if the user exerts a force on the joint. A position set by the user is thus automatically maintained.

The joint is preferably designed in such a way that a cable connecting the scanner with the processing device can be fed through the interior of the joint, so that the cable lies protected and therefore cannot be damaged. For this, the preferred embodiment of the invention is characterised in that for passing through a cable the disc-shaped element is made hollow.

This makes it possible to provide a cable loop in the disc-shaped element, so that the cable is not pulled taut when the disc-shaped element is turned. In addition, the preferred embodiment is characterised in that the arm is made hollow, and in that the disc-shaped element has a hole on the attachment point of the arm. This makes it possible for the cable to be fed through the disc and through the arm, so that a protected position of the cable is guaranteed.

The frictional force between the conical axis and the conical bearing will generally be sufficient, under the influence of the resilient element, to maintain the position of the joint. In order to increase the friction, a preferred embodiment of the invention is designed in such a way that the at least partially conical axle and the at least partially conical recess are toothed. The mutual position of the axis relative to the supporting block is ensured by the mutual engagement of the teeth.

The spring tension of the resilient element must be such that sufficient friction occurs between the axle and the supporting block, and that the conical axle is not displaced relative to the conical wall of the supporting block by the weight of the scanner, while it must be easily possible for the user to break the contact between the axle and the wall of the supporting block. For this, the preferred embodiment of the invention is designed in such a way that the at least partially conical axle is provided on the inside with a screw thread for fitting an adjusting screw, in such a way that the tension of the resilient element can be adjusted.

BRIEF DESCRIPTION OF THE DRAWINGS

The invention will be explained below with reference to the figures, in which.

DETAILED DESCRIPTION OF THE EMBODIMENT

Figure 1:
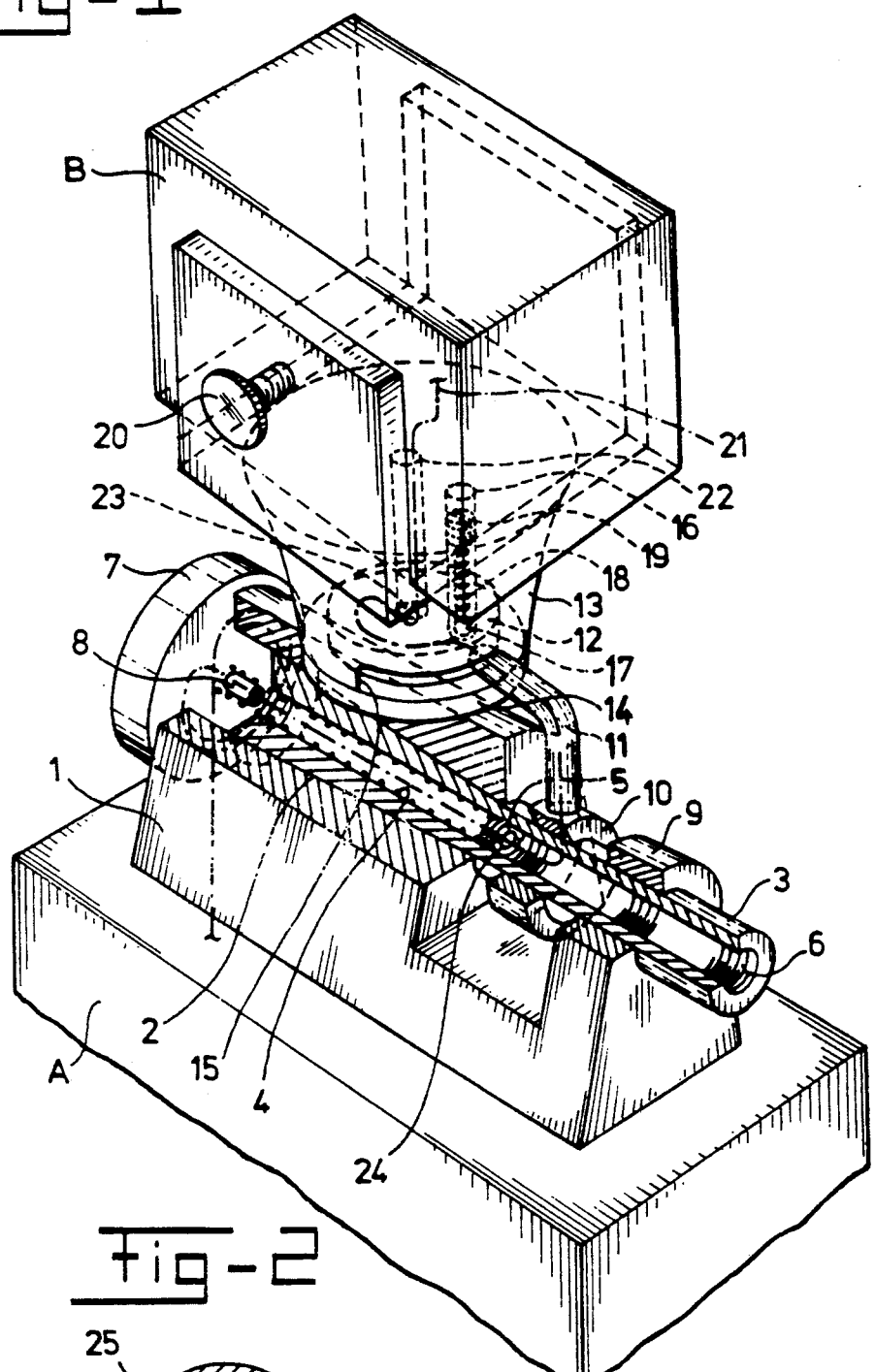
FIG. 1 shows in perspective, in partial cross-section, a preferred embodiment of the joint according to the invention.

The supporting block 1, which is connected to the processing device A, has an at least partially conical recess 2. The at least partially conical, hollow axle 3 rests in said recess 2, in such a way that the conical parts of the axle 3 and of the recess 2 lie closely against each other. Both the supporting block 1 and the axle 3 are preferably made of metal, but they can also be made of plastic. A force is exerted on the axle 3 in the direction of the taper by a spring 4 which lies largely inside the hollow axle 3. One end of the spring 4 rests against a screw 5, which is fixed adjustably, by means of a screw thread 6 provided for the purpose, in the hollow axle 3. The other end of the spring 4 rests against a cap 7, which is fixed to the block 1 in such a way that it closes off the recess 2. The position of the spring 4 is further secured by a bush 8 which is fixed to the cap 7 and projects into the spring 4. The cylindrical part of the axle 3 is supported by a support 9, in which the axle 3 can move freely. Between the block 1 and the support 9 the axle 3 is enclosed by a bracket 10 which is connected to a curved arm 11. The bracket 10 is connected to the axle 3 and the arm 11 in such a way that it cannot move, so that a movement of the axle 3 will also be carried out by the arm 11. The arm 11 can therefore rotate more than 90° relative to the position shown. A disc 12 is fixed immovably to the arm 11, which describes a curve of 90°. The disc 12 is rotatably mounted in a holder 13 which is preferably made solid, and which is shut off by a cover plate 14. The holder 13 is provided with a slot 15 which permits rotation of the arm 11 relative to the holder 13. For the exertion of a frictional force on the disc 12 the holder 13 is provided with a through hole 16, in which a ball 17, a spring 18 and a screw 19 are provided. The ball 17 is pressed by the spring 18 with such force against the disc 12 that the disc 12 does not turn relative to the holder 13 without force being exerted by the user on the joint. The resilience of the spring 18 can be set by turning the screw 19, which engages in a screw thread (not shown) provided on the inside of the hole 16. The axle 3 constitutes a first rotational axis, while the disc 2 provides a second rotational axis. Due to the fact that the axis of rotation of the disc 12 forms a right angle with the axle 3, the holder 13 can be rotated in any desired way relative to the supporting block 1.

The scanner B is fitted in the holder 13 and is fixed by means of a screw 20. The scanner B is connected to the processing device A by means of a cable 21, which can be an electrical or optical cable and can consist of one or more constituent cables. According to the invention, the joint is designed in such a way that the cable can be fed through the inside of the joint. This has the advantage that the cable is protected by the joint from damage. For the feeding of the cable through the joint, the holder 13 is provided with a through hole 22 lying opposite a central hole 23 in the disc 12. The disc 12 is made hollow, so that space is present for the accommodation of a cable loop. This makes it possible to rotate the disc 12 relative to the holder 13 without the cable 21 being pulled taut. The disc 12 is provided on its side face with a further through hole (not shown) which forms a connection between the space in the disc 12 and the arm 11 which is made hollow for passing through of the cable 21. The bracket 10 and the axle 3 are also provided with interconnected through holes (not shown), so that the cable 21 can be fed from the arm 11 into the hollow axle 3. The screw 5 is provided with a hole 24 for further passing through of the cable 21. The hollow bush 8 is designed in such a way that the cable 21 is clamped in it. The cap 7 is, like the disc 12, preferably made hollow for accommodating a cable loop. At the side facing the processing device A, the cap 7 is provided with a through hole (not shown) for passing through the cable 21.

Figure 2:
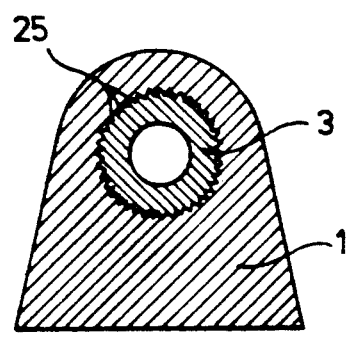
FIG. 2 shows in cross-section another embodiment of the conical axis and the supporting block.

FIG. 2 shows, in cross-section, an alternative embodiment of the block 1 and the axle 3. In this embodiment both the inside of the block 1 and the outside of the axle 3 are provided with teeth 25. The use of mutually engaging teeth 25 produces a better locking of the axle 3 relative to the block 1. Since the number of possible positions of the axle 3 relative to the block 1 is determined by the number of teeth 25, it is advantageous to select a large number of teeth 25.

Of course, other embodiments of the joint according to the invention are also possible. For example, the arm 11 can be made straight, and can be connected to the centre of the disc 12. If a rotation about only one rotational axis is desired, the arm 11 can also be directly connected to the holder 13, leaving out the disc 12. The axle 3 can be turned through 360° by leaving out the support 9, shortening the supporting block 1, and fixing the assembly of the bracket 10 and the arm 11 turned through 180° to the axle 3. The partially conical recess 2 can in this case be provided at its tapered end with a cylindrical part which takes over the function of the support 9.

I claim:

1. A symbol code scanning system comprising a scanning means, a processing device for processing signals produced by said scanning means, and an adjustable mechanical joint connecting said scanning means and said processing device, said joint comprising:
   a supporting block connected to said processing device, said supporting block being provided with a recess having a conical part,
   a scanner holding means receiving said scanning means,
   an at least partially hollow axle having a conical part, said axle being movably arranged in said recess,
   an arm mechanically connecting said scanner holding means and said axle,
   a resilient element arranged in said at least partially hollow axle so as to press said axle into said recess such that said conical part of said axle engages said conical part of said recess, and
   said resilient element being held by a first mounting means connected to said axle and a second mounting means connected to said supporting block.

2. A system according to claim 1 wherein said conical part of said axle and said conical part of said recess have smooth surfaces.

3. A system according to claim 1, wherein said conical part of said axle and said conical part of said recess are toothed.

4. A system according to claim 1, wherein said axle is internally provided with a screw thread engaging an adjusting screw so as to allow adjustment of said resilient element.

5. A symbol code scanning system comprising a scanning means, a processing device for processing signals produced by said scanning means, and an adjustable mechanical joint connecting said scanning means and said processing device, said joint comprising:
   a supporting block connected to said processing device, said supporting block being provided with a recess having a conical part,
   a scanner holding means receiving said scanning means,
   an at least partially hollow axle having a conical part, said axle being movably arranged in said recess,
   a resilient element arranged in said at least partially hollow axle so as to press said axle into said recess such that said conical part of said axle engages said conical part of said recess, said resilient element being held by a first mounting means connected to said axle and a second mounting means connected to said supporting block, said axle providing a first axis of rotation,
   a disc-shaped element rotatably fitted in said scanner holding means so as to provide a second axis of rotation,
   an arm mechanically connecting said disc-shaped element and said axle, said arm being shaped such that said second rotational axis is substantially perpendicular to said first rotational axis.

6. A system according to claim 5, wherein said conical part of said axle and said conical part of said recess have smooth surfaces.

7. A system according to claim 5, wherein said conical part of said axle and said conical part of said recess are toothed.

8. A system according to claim 5, wherein said axle is internally provided with a screw thread engaging an adjusting screw so as to allow adjustment of said resilient element.

9. A system according to claim 5, wherein said scanner holding means is provided with means for exerting a frictional force on said disc-shaped element.

10. A system according to claim 9, wherein said means for providing said frictional force comprises a ball and a spring arranged in said scanner holding means, said ball contacting said disc-shaped element and said spring pressing said ball onto said disc-shaped element.

11. An adjustable mechanical joint for providing relative movement in more than one direction between first and second means adapted to be coupled thereto said joint comprising:
   a supporting block adapted to be connected to said first means, said supporting block being provided with a recess having a conical part,
   a holding means adapted to receive said second means,
   an at least partially hollow axle having a conical part, said axle being movably arranged in said recess,
   a resilient element arranged in said at least partially hollow axle so as to press said axle into said recess such that said conical part of said axle engages said conical part of said recess, said resilient element being held by a first mounting means connected to said axle and a second mounting means connected to said supporting block, said axle providing a first axis of rotation,
   a hollow disc-shaped element rotatably fitted in said holding means so as to provide a second axis of rotation,
   an arm mechanically connecting said disc-shaped element and said axle, said arm being shaped such that said second rotational axis is substantially perpendicular to said first rotational axis,
   a hole in said holding means, said arm being hollow and aligned with said hollow disc-shaped element and said at least partially hollow axle, said first mounting means having a hole therethrough aligned with said at least partially hollow axle whereby a cable may extend through said joint for intercoupling said first and second means which are adapted to be coupled thereto.

12. An adjustable mechanical joint according to claim 11, wherein said conical part of said axle and said conical part of said recess have smooth surfaces.

13. An adjustable mechanical joint according to claim 11, wherein said conical part of said axle and said conical part of said recess are toothed.

14. An adjustable mechanical joint according to claim 11, wherein said axle is internally provided with a screw thread engaging an adjusting screw so as to allow adjustment of said resilient element.

15. An adjustable mechanical joint according to claim 11, wherein said holding means is provided with means for exerting a frictional force on said disc-shaped element.

16. An adjustable mechanical joint according to claim 11, wherein said means for providing a frictional force comprises a ball and a spring arranged in said holding means, said ball contacting said disc-shaped element and said spring pressing said ball onto said disc-shaped element.

17. An adjustable mechanical joint according to claim 11, wherein said first mounting means comprises a hollow cap for accommodating a cable loop.

* * * * *